United States Patent [19]

Hall et al.

[11] 4,383,048

[45] May 10, 1983

[54] PROCESS FOR MAKING LOW DENSITY CHLORINATED POLYVINYL CHLORIDE FOAM

[75] Inventors: Dale R. Hall, Avon Lake; Charles N. Bush, Bay Village, both of Ohio

[73] Assignee: The B. F. Goodrich Company, Akron, Ohio

[21] Appl. No.: 425,838

[22] Filed: Sep. 28, 1982

[51] Int. Cl.$^3$ .............................. C08J 9/06; C08J 9/14
[52] U.S. Cl. ................................. 521/85; 264/DIG. 5; 521/92; 521/97; 521/98; 521/145; 521/908; 521/909; 521/910
[58] Field of Search ...................... 521/85, 92, 97, 98, 521/145, 908, 909, 910; 264/DIG. 5

[56] References Cited

U.S. PATENT DOCUMENTS

| | | | |
|---|---|---|---|
| 2,758,980 | 8/1956 | Talalay et al. | 521/85 |
| 2,909,493 | 10/1959 | Bush | 521/145 |
| 2,930,771 | 3/1960 | Wade | 521/85 |
| 2,951,819 | 9/1960 | Wade | 521/85 |
| 3,167,520 | 1/1965 | Wade | 521/85 |
| 3,331,790 | 7/1967 | Scheurlen et al. | 521/85 |
| 3,393,260 | 7/1968 | Miler | 521/79 |

*Primary Examiner*—Morton Foelak
*Attorney, Agent, or Firm*—James R. Lindsay

[57] ABSTRACT

A low density foam product is formed from a chlorinated polyvinyl chloride polymer (CPVC) composition containing a primary blowing agent and a nucleating system comprised of an alkali metal borohydride and a proton donor activator.

8 Claims, No Drawings

PROCESS FOR MAKING LOW DENSITY CHLORINATED POLYVINYL CHLORIDE FOAM

BACKGROUND OF THE INVENTION

The term "low density foam" generally is applied to a cellular product which has a small cell structure and which has a density of 20 lbs/ft$^3$ (0.32 g/cm$^3$) or less.

Although low density foams can be produced from a variety of polymer compositions, chlorinated polyvinyl chloride polymers impart desirable properties to a low density foam that are not normally found in foams made from other types of polymers. Polyvinyl chloride homopolymers, however, normally will not produce satisfactory low density foams since they usually contain about 5 to 10 percent crystallinity. Such crystallites do not melt completely below about 215° C. Because of the poor thermal stability of polyvinyl chloride homopolymers and other problems relating to the polymer physics of the system at processing temperatures of about 215° C., it is not feasible to process the polymer at the melting temperature of the crystallites. If one attempts to extrude the polyvinyl chloride homopolymer at temperatures below 215° C. to produce low density foam, a foam of poor quality results, since the crystallites act as physical crosslinks which restrict the growth of cells and cause a high density foam to be formed. Chlorinated polyvinyl chloride homopolymers, however, can be formed essentially free of crystallites and, as a result, are not subject to the aforesaid problem.

U.S. Pat. No. 3,366,580 to Kraemer, et al., the disclosure thereof being incorporated herein by reference, teaches that a foam product can be produced from post-chlorinated polyvinyl chloride resin. In accordance with the process described therein, a polyvinyl chloride polymer that has been post-chlorinated to a chlorine content of at least 60%, is impregnated with a halogenated hydrocarbon blowing agent (for example, trichloromonofluoromethane) and subsequently expanded into a rigid, predominantly closed-cell foam. The closed-cell structure of the foam contributes to the physical strength of the foam and enables the hydrocarbon blowing agent to become entrapped within the closed cells of the foam.

When a foam is intended to be used as a structural or insulation product, a low density foam consisting largely of closed cells of very small size normally would be preferred. Cellular structures with closed cells of less than 500 microns, desirably less than 350 microns, in diameter are desirable.

The use of a "nucleating agent" allows the formation of an increased percentage of closed cells in a foam and, thus, results in a better quality low density foam product. A nucleating agent in a thermoplastic polymer creates minute cell sites into which blowing agent gases can expand. The nucleating agent does not function as the blowing agent for the foam composition. Instead, a primary blowing agent is used in conjunction with the nucleating system. Nucleating agents may be finely-divided inorganic solids, a compound which decomposes to form nuclei cell sites within the thermoplastic polymer mass when heated to a temperature below that at which the polymer is objectionably affected, or a combination of materials which react in situ within the thermoplastic polymer mass to produce the desired nuclei cell sites. Examples of inorganic solids which have been described as suitable for use as nucleating agents are silica, talc, alumina, diatomaceous earth, calcium carbonate, calcium sulfate, and alkali metal or aluminum silicates. Examples of compounds which decompose or react together to form cell sites at acceptable temperatures are mixtures of alkali metal bicarbonates and solid organic acids such as citric acid or oxalic acid, and hydrated salts such as hydrated sodium citrate. A mixture of finely-divided silica aerogel, citric acid and sodium bicarbonate has been suggested as a nucleating agent that performs particularly well. While the aforementioned nucleating agents are reported to increase the number of closed cells produced, they have not been found to produce foams of the desired uniform small cell size in chlorinated polyvinyl chloride polymer foams (as will be illustrated hereinafter).

In the copending application of Nehmey and Summers (Ser. No. 301,906), filed Sept. 14, 1981), the disclosure thereof being incorporated herein by reference, a process is disclosed for producing a low density chlorinated polyvinyl chloride polymer foam using a halogenated hydrocarbon with 1 to 3 carbon atoms as a primary blowing agent and azodicarbonamide as a nucleating agent. The resulting foam is characterized as having a closed-cell structure, a cell size diameter of less than 500 microns and a density of less than 20 lbs/ft$^3$ (0.32 g/cm$^3$). A low density foam possessing such properties would have a low thermal conductivity and be particularly useful in insulating applications.

While a low density chlorinated polyvinyl chloride foam having many excellent foam characteristics is produced when azodicarbonamide is used as a nucleating agent, the use of azodicarbonamide does reduce the dynamic thermal stability of the foam, and, as a consequence, requires the use of larger quantities of stabilizer to achieve the desired level of thermal stability.

SUMMARY OF THE INVENTION

In accordance with the present invention, a chlorinated polyvinyl chloride polymer low density foam is produced using (1) a primary blowing agent (such as a halogenated hydrocarbon with 1 to 3 carbon atoms, gaseous nitrogen, the combination of micronized sodium bicarbonate and citric acid, ethanol, methanol, diethyl ether, and the like) and (2) an alkali metal borohydride in conjunction with a proton donor activator as a nucleating agent for forming minute hydrogen gas cell sites into which the gaseous blowing agent can expand. A low density foam is produced that has a substantially closed-cell structure, extremely fine, substantially uniform-sized cells, a density of 20 lbs/ft$^3$ (0.32 g/cm$^3$) or less, low thermal conductivity, and excellent dynamic thermal stability without the necessity of using the substantial amounts of stabilizer required when azodicarbonamide is used as a nucleating agent.

Although alkali metal borohydrides heretofore have been used as a primary blowing agent for latices (U.S. Pat. No. 2,758,980) and for plastisols (British Pat. No. 799,750), the use of alkali metal borohydrides in nucleating systems for use with a primary blowing agent has not been suggested heretofore.

The low density foams produced in accordance with the present invention have excellent insulation properties enabling them to be used in a variety of insulating applications such as rigid wall insulation, roofing insulation panels, and pipe insulation.

DETAILED DESCRIPTION OF THE INVENTION

The chlorinated polyvinyl chloride low density foams of the present invention are prepared from a composition comprising chlorinated polyvinyl chloride polymer, a primary blowing agent, and a nucleating system comprised of an alkali metal borohydride in conjunction with a proton donor activator. A stabilizer for the chlorinated polyvinyl chloride polymer, desirably, also is a component of the composition. Other ingredients customarily added to chlorinated polyvinyl chloride polymer compositions (such as processing aids, lubricants, etc.) also may be included in the composition. The low density foams of the present invention are characterized as having a predominantly closed-cell cellular structure (i.e., a cellular structure in which at least 60% by volume, preferably 80% by volume, of the cells are "closed-cell"); a predominant cell size (cell diameter) less than 500 microns, preferably a cell size less than 350 microns; a density of less than 20 lbs/ft$^3$ (0.32 g/cm$^3$), preferably a density of from 1 to 10 lbs/ft$^3$ (from 0.016 to 0.16 g/cm$^3$); and a low thermal conductivity, preferably a thermal conductivity of less than 0.20 BTU/(hr.)(ft$^2$)(°F./in)[(0.25 cal/hr)(cm$^2$)(°c/cm)].

The chlorinated polyvinyl chloride polymer (CPVC) used in producing the low density foam of the present invention can be prepared by the post-chlorination of polyvinyl chloride resin (PVC). Various post-chlorination processes may be used. In one such process, the post-chlorination of the polyvinyl chloride polymer involves forming a suspension of finely-divided PVC particles in an aqueous medium which optionally contains from about 5% to 25% by volume of a chlorohydrocarbon which functions as a swelling agent for the PVC particles. The aqueous medium then is saturated with chlorine gas at a temperature below 65° C. The resulting suspension thereafter is photo-illuminated to induce the chlorination reaction to occur between the dissolved chlorine and the suspended PVC particles. The chlorination reaction is terminated when the desired amount of chlorine has been reacted with the PVC polymer by extinguishing the photo-illumination. Such a process is described in U.S. Pat. No. 2,996,489, the disclosure thereof being incorporated herein by reference. The chlorination rate in the above-described chlorination process can be increased by adding to the PVC suspension a catalytic amount of a free radical-producing agent such as, for example, azo compounds, peroxy compounds, peroxides, nitroso compounds, redox catalysts, and the like. Also, in U.S. Pat. No. 3,167,535, the disclosure thereof being incorporated herein by reference, there is described a method for increasing the reaction rate of the chlorination process by adding to the PVC suspension a catalytic amount of a reducing agent, such as, for example, reducing sugars, aldehydes, alkali metal sulfides, metabisulfites, bisulfites, hydrosulfites, and the like. U.S. Pat. No. 3,100,762, the disclosure thereof being incorporated herein by reference, states that a faster chlorination of the PVC polymer can be realized by conducting the chlorination at elevated temperatures and pressures in the presence of a swelling agent, but in the absence of photo-illumination. It is stated therein that no catalyst and, particularly, no photo-illumination is required when chlorination is accomplished using a temperature within the range from about 60° C. to about 100° C. and a reactor pressure within the range from about 20 to about 80 psig if oxygen is substantially excluded from the reactor. It further teaches that inferior chlorinated products are obtained using the aforementioned reaction conditions if the swelling agent is omitted from the reaction mixture.

Prior to post-chlorination, the polyvinyl chloride polymer generally has a chlorine content of about 56.7% by weight and an inherent viscosity in the range of about 0.50 to about 1.20 when measured in accordance with the procedure set forth in ASTM-D1243. Generally, the polyvinyl chloride polymer is in macrogranular form.

The post-chlorinated polyvinyl chloride polymers used in the present invention desirably have a density in the range of about 1.46 to about 1.66 gms/cc at 25° C. and a chlorine content of from about 60% to about 73% by weight. The preferred chlorine content of the polymer, however, is from about 64% to about 72% by weight. As the chlorine content of the polymer is increased from 60% to 64% by weight, two advantages are realized. First, the ability of the polymer to tolerate high temperatures is increased from about 80° C. to about 100° C. Second, as the chlorine content is varied the residual crystallinity of the PVC polymer decreases, permitting lower density foams to be formed. Although it is preferred to use a post-chlorinated polyvinyl chloride homopolymer, the term "polyvinyl chloride polymer (or resin)", when used herein, is meant to include any thermoplastic polymer produced from a monomeric mixture containing not less than about 75% by weight of vinyl chloride. Thus, copolymers of vinyl chloride with minor amounts of polymerizable monoolefinic or vinyl-type comonomers can be employed. Examples of such comonomers are vinylidene chloride, vinyl acetate, methyl acrylate, styrene, acrylonitrile, methylmethacrylate, ethylene, propylene, and the like.

The primary blowing agent used in the expansion of the chlorinated polyvinyl chloride polymer composition include the so-called "physical blowing agents" which are gaseous at temperatures below the processing temperature at which the CPVC composition is expanded and the so-called "chemical blowing systems" which decompose or interreact upon being heated to a temperature below the processing temperature and liberate a gaseous product. Typical physical blowing agents include aliphatic hydrocarbons such as n-pentane, 2-methylbutane, 2,2-dimethylpropane, 1-pentane, cyclopentane, n-hexane, 2-methylpentane, 3-methyl pentane, 2,3-dimethylbutane, 2,2-dimethylbutane, 1-hexane, cyclohexane, n-heptane, 2-methylhexane, 2,2-dimethylhexane, chlorinated hydrocarbons such as methyl chloride, methylene dichloride and trichloromonofluoromethane, diethyl ether, and methyl ethyl ketone. Typical chemical blowing systems include ammonium carbonate, ammonium bicarbonate, sodium bicarbonate, a mixture of ammonium chloride and sodium nitrite, tert-butylamine nitrite, guanidine nitrite, and dinitrosopentamethylene tetramine. Preferred primary blowing agents are the halogenated hydrocarbons containing 1 to 3 carbon atoms such as methyl chloride, methylene dichloride, ethyl chloride, ethylene dichloride, n-propyl chloride and methyl bromide. An even more preferred group of halogenated hydrocarbon primary blowing agents are the chlorofluoroalkanes containing from 1 to 2 carbon atoms such as trichloromonofluoromethane, dichlorodifluoromethane, dichloromonofluoromethane, monochlorodifluoromethane, trichlorotrifluoroethane, dichlorotetrafluoroethane, and monochlorotrifluoroethane. When the primary blowing agent is a gas at ambient temperatures and pressures (for example, the halogenated hydrocarbons containing 1 to 3 carbon atoms), the primary blowing agent normally is combined with the chlorinated polyvinyl chloride polymer at above ambient pressure (although a reduced temperature could be used) so as to convert the primary blowing agent to a liquified state which can readily be impregnated (dissolved) into the CPVC polymer. The impregnated polymer is maintained at above ambient pressure and/or at a reduced temperature to retain the primary blowing agent dissolved in the polymer or in a liquified state until it is desired to expand the polymer to form the cellular product. For example, to impregnate the CPVC polymer to be foamed with a primary blowing agent which is a gas at ambient temperatures and pressures, particles of CPVC polymer and other compounding ingredients of the composition (such as processing aids, the nucleating system, stabilizers, etc.) may be placed in a pressure vessel, which is rotatable so as to impart a tumbling motion to the CPVC particles or is equipped with mixing means, and the liquified primary blowing agent charged into the vessel. The vessel normally is then heated to a temperature in the range of 50° to 150° C., but not exceeding the softening point of the CPVC polymer, under sufficient pressure to maintain a substantial portion of the primary blowing agent in liquified state. The contents of the vessel are mixed together until the desired amount of the blowing agent is absorbed by the CPVC particles. It is important in avoiding agglomeration of the CPVC particles to maintain the temperature within the vessel below the softening point of the CPVC polymer. After absorption of the blowing agent, the contents of the vessel are cooled below the boiling point of the blowing agent at atmospheric (ambient) pressure. The pressure in the vessel then is reduced to ambient pressure. The composition remains in unexpanded form as long as the composition is maintained at a temperature below the boiling temperature of the blowing agent. When the primary blowing agent is a liquid or solid material at ambient temperature and pressure, the primary blowing agent need only to be combined with the CPVC polymer using conventional compounding techniques but taking care not to reach a processing temperature that would prematurely activate the blowing system. Although the primary blowing agent can be used in an amount from about 5 to 50 parts by weight per 100 parts by weight of the CPVC polymer, it is preferred to use from about 10 to 40 parts by weight of the blowing agent per 100 parts by weight of the CPVC polymer. If a blowing agent that is a gas at ambient temperatures and pressure is absorbed into the CPVC particles and stored for any length of time after absorption, even at lowered temperatures or higher than ambient pressures, it may be desirable that a higher amount of the blowing agent than indicated above be absorbed into the CPVC polymer initially to allow for some loss of blowing agent during storage.

The nucleating system used in the present invention to produce cell sites into which the blowing agent gas can expand is a combination of an alkali metal borohydride and a proton donor activator. The alkali metal borohydrides include sodium borohydride, potassium borohydride, lithium borohydride, rubidium borohydride and cesuim borohydride. The alkali metal borohydride will react with protons provided by the proton donor activator and form hydrogen gas as a reaction product which produces minute cell sites (normally less than about 50 microns in diameter) within the chlorinated polyvinyl chloride polymer composition into which the blowing agent gas expands. The proton donor activator may be (1) any hydrate that is compatible with the CPVC polymer and that will give up its water of hydration above ambient temperatures within the production area (preferably a temperature of 25° C.) but below the highest processing temperature which the CPVC polymer composition experiences before the CPVC polymer composition expands or (2) any organic acid that is compatible with the CPVC polymer and that will react with the alkali metal borohydride to produce hydrogen as a reaction product at temperatures above ambient temperatures within the production area (preferably a temperature of 25° C.) but below the highest processing temperature which the CPVC polymer composition experiences before the CPVC polymer composition expands. Desirably, if the proton donor activator is a hydrate, a hydrate is selected which will give up its water of hydration at a temperature between about 60° to 180° C. More preferred is a hydrate which gives up its water of hydration at a temperature between about 120° to 165° C. If the proton donor activator is an organic acid, desirably an acid is selected which will react with the alkali metal borohydride at a temperature between about 60° to 180° C., preferably between about 120° to 160° C. If nucleation of the CPVC polymer foam composition is to take place within an extruder, the proton donor activator should have a melting point above the highest temperature reached within the extruder, preferably a melting point above 180° C. Hydrate proton donor activators are exemplified by sodium citrate dihydrate, silicic acid hydrate, barium citrate heptahydrate, and calcium sulfate dihydrate. Organic acids which can function as the proton donor activator include phthalic acid, terephthalic acid, mellitic acid, benzene pentacarboxylic acid, pyromellitic acid, mellophannic acid, prehnitic acid, trimesic acid, trimellitic acid, hemimellitic acid, isophthalic acid, p-chlorobenzoic acid, tartaric acid, fumaric acid, mesaconic acid, and polyacrylic acid polymers and copolymers. The amount of alkali metal borohydride used in the CPVC polymer foam composition may vary, but desirably, is from about 0.01 to about 2 parts by weight, preferably from about 0.10 to 0.50 parts by weight, of the alkali metal borohydride per 100 parts by weight of the CPVC polymer in the foam composition. The amount of proton donor activator used in the CPVC polymer foam composition also may vary but, desirably, is from 0.5 to 2.5 times, preferably from 1 to 1.5 times, the stoichiometric equivalent for reaction with the alkali metal borohydride in the composition for complete liberation of its hydrogen atoms.

As indicated above, it is preferred to include a stabilizer for the CPVC polymer in the foam composition. Suitable stabilizers include barium, cadmium, zinc, tin and lead salts of monocarboxylic acids (such as barium benzoate, barium caprate, barium caprylate, barium 2-ethylhexaamoate, barium laurate, barium stearate, cadmium stearate, coprecipitated fatty acid soaps of cadmium and barium, stannous maleate, dibasic lead phthalate, tribasic lead maleate, dibasic lead stearate, and zinc stearate), and the organo-tin and organo-antimony stabilizers (such as the dialkyl tin and antimony mercaptides, carboxylates, and thiazoles, for example, dibutyltin dilaurate, dibutyltin maleate, di(n-octyl)tin maleate, dibutyltin bis(lauryl mercaptide), dibutyltin, S,S-bis(isooctyl thioglycolate), dibutyltin β-mercaptoproprionate, di-n-octyltin S,S-bis(isooctyl thioglycolate), di-n-octyltin β-mercaptoproprionate, and dibutylantimony S,S,S-tris(isooctyl thioglycolate), and the like. Usually, from about 0.1 to 10 parts by weight, preferably 0.5 to 5 parts by weight, of stabilizer per 100 parts by weight of chlorinated polyvinyl chloride polymer is used in the foam composition. Other additives frequently included in CPVC polymer foam compositions are processing aids such as chlorinated polyethylene polymers, and styrene-acrylonitrile polymers (usually in an amount of from 1 to 30 parts by weight, preferably 5 to 20 parts by weight per 100 parts by weight of the CPVC polymer in the composition); lubricants such as calcium stearate and ester waxes (usually in an amount of from 1 to 5 parts by weight of lubricant per 100 parts by weight of the CPVC polymer in the composition); and cell stabilizers (such as sodium lauryl sulfate and sodium alpha-olefin sulfonates).

The chlorinated polyvinyl chloride foam composition ingredients can be combined in any convenient manner. For example, when solid blowing agent systems are used, the ingredients of the foam composition can be mixed together on a roll mill, being cautious not to allow the temperature of the mix to reach a temperature at which the blowing agent is activated so as to cause a premature "blow". However, the temperature of the mix can be permitted to reach a temperature at which the nucleating system is activated to allow nucleation (the formation of minute cell sites) of the foam composition to occur while the mix is banding on the roll mill. Alternatively, the temperature of the composition while on the roll mill is kept below a temperature at which the nucleating system of the composition is activated to prevent nucleation from occurring at this stage of the processing. The milled composition then can be sheeted and molded in an appropriate heated closed-mold or between heated platens to form expanded foam sheets or can be cubed or otherwise pelletized and stored for latter processing. If nucleation of the composition has not been allowed to occur while the composition is on the roll mill, nucleation will occur as the composition is being heated to the temperature at which the composition will expand during subsequent processing operations. As described above, if the blowing agent is a gas at ambient temperature and pressure, the ingredients of the foam composition other than the blowing agent can be mixed together, either on a roll mill or within an internal mixer, and the blowing agent then can be added by causing it to be absorbed or dissolved in the polymer at a reduced temperature and/or at an elevated pressure to maintain the blowing agent at least substantially liquified. The composition with the blowing agent absorbed therein must be kept at a sufficiently low temperature and/or a sufficiently high pressure to retain the blowing agent absorbed within the CPVC polymer particles or cubed or otherwise pellitized composition until expansion of the composition is desired. Alternatively, a low density foam can be formed by feeding the chlorinated polyvinyl chloride foam composition through an extruder in which the extrusion cylinder and/or stock screw are equipped with heating elements. As the foam composition is advanced through the extruder, it is heated progressively to a temperature above that required to convert the composition to a viscous mass, to cause nucleation of the foam composition (if nucleation previously has not occurred), and to activate the blowing system. However, while the foam composition is confined within the extrusion cylinder, it is unable to expand even though the blowing agent gases have been formed. The blowing agent gases, however, generate substantial pressures within the extruder. When the hot measured foam composition is discharged through the extruder head into the ambient atmosphere with reduced pressure, the blowing agent expands the foam composition into the desired cellular product. The size and shape of the extrudate are, of course, a function of the extruder die through which the foam composition exited from the extruder.

A preferred method of making a low density foam product extrudate utilizes halogenated hydrocarbons containing 1 to 3 carbon atoms as the primary blowing agent which is combined with the other ingredients of the foam composition within an extruder. In accordance with this preferred process, the components of the foam composition, other than the blowing agent are combined outside of the extruder and are fed into the extruder in particulate form as cubes or pellets. As the CPVC polymer mix is advanced through the extruder it is heated progressively to a temperature sufficient to convert the mix to a viscous mass. At a zone within the extruder at which the mix exists as a viscous mass, the halogenated hydrocarbon blowing agent is injected under pressure into the extruder at the proper rate and becomes uniformly dispersed or dissolved in proper proportion throughout the viscous mass. The temperature of the mix is maintained above the boiling point of the halogenated hydrocarbon blowing agent. However, while the hot foam composition is confined within the extruder, expansion of the composition is confined within the extruder, expansion of the composition is prevented, although substantial pressures are generated. As the hot foam composition is discharged through the extruder head into the ambient atmosphere, the desired cellular product is formed.

The present invention is illustrated by the following examples:

EXAMPLE I

This example evaluates the nucleating effect of a variety of nucleating agents heretofore proposed. The cellular products were prepared using the following chlorinated polyvinyl chloride polymer foam formulation:

| FOAM RECIPE | |
| --- | --- |
| Material | Parts/Wt. |
| Chlorinated polyvinyl chloride polymer (67% by weight bound chlorine) | 100.0 |
| Dibutyltin Bis(isooctyl thioglycolate) | 3.0 |
| Styrene/acrylonitrile copolymer (75%/25% by weight) | 10.0 |
| Chlorinated polyethylene (35% by weight bound chlorine) | 3.0 |
| Calcium stearate | 0.8 |
| N,N'—ethylene bis-stearamide | 0.8 |
| Ester wax | 0.8 |
| Nucleating agent | 1.0 |

The ingredients were melt mixed on a two-roll mill. The resulting composition was cubed (approximately ⅛ inch cubes) and placed in a rotatable pressure vessel. 30 parts by weight of a blowing agent (trichloromonofluoromethane) then were charged to the vessel. The contents of the vessel were maintained for 48 hours at a pressure of 80 psi and a temperature of 80° C. The contents of the vessel were cooled to 25° C. Upon cooling, the cubes contained approximately 24 parts by weight of the blowing agent absorbed therein. The sorbed cubes then were extrusion foamed through a dog-bone die having a width of 0.396 inch and a thickness of 0.042 inch to 0.067 inch on a ¾ inch extruder having a barrel with a length to diameter ratio of 24/1 and a 3/1 compression ratio screw. The barrel zone heaters along the extruder, in order of advancement of material, were set at 105° C., 170° C. and 160° C. with a die zone temperature of 155° C. The foam density (measured in pounds per cubic foot, pcf,) and cell size (in microns) obtained using the various nucleating agents indicated are set forth in Table I.

TABLE I

| Sample | Nucleating Agent | Density (pcf) | Cell Size (microns) |
|---|---|---|---|
| 1 | None (Control) | 2.1 | 900 |
| 2 | CaCO₃ (0.07 micron) | 2.0 | 1000 |
| 3 | CaCO₃ (0.7 micron) | 2.1 | 950 |
| 4 | CaCO₃ (2.3 microns) | 2.0 | 500-750 |
| 5 | Silica (0.01 micron) | 1.9 | 1250 |
| 6 | Silica (2.4 microns) | 2.0 | 750 |
| 7 | Aluminum Silicate (4.5 microns) | 1.8 | 750 |
| 8 | TiO₂ (0.2 micron) | 1.9 | 800-1100 |
| 9 | Furnace Black (0.06 micron) | 2.8 | 1000 |

EXAMPLE II

This example compares the use of sodium borohydride, azodicarbonamide, and the combination of sodium borohydride and a proton donor activator as nucleating agents for CPVC polymer low density foam. The cellular products were prepared using the following chlorinated polyvinyl chloride polymer foam formulation:

| FOAM RECIPE | |
|---|---|
| Material | Parts By Weight |
| Chlorinated polyvinyl chloride polymer (67% by weight bound chlorine) | 100.0 |
| Dibutyltin bis(isooctyl thioglycolate) | 3.0 |
| Styrene/acrylonitrile copolymer (75%/25% by weight) | 10.0 |
| Chlorinated polyethylene (36% by weight bound chlorine) | 3.0 |
| Ester wax | 2.0 |
| TiO₂ (rutile) | 1.0 |
| Nucleating system | Varied |

The ingredients were melt mixed and cubed as described in Example I. The cubed composition was sorbed with trichloromonofluoromethane and foamed as described in Example I except that a dog-bone die having a width of 0.587 inch and a thickness of 0.065 inch to 0.125 inch was used. The foam density (measured in pounds per cubic foot, pcf), cell size (in microns), and dynamic thermal stability, DTS, obtained using the varying levels of the nucleating system, measured against a control containing no nucleating agent, are set forth in Table II. DTS is the time interval, expressed in minutes, between fusion (maximum torque) and breakdown (determined by sudden increase in torque and color change) in a Brabender Plasti Condor Torque Rheometer using a No. 5 Roller Head (Model PLV 300). The test conditions employed are 400° F. bowl temperature, 35 rpm, and 35 gram charge.

This Example illustrates that extremely fine cell size is realized when using the sodium borohydride/proton donor activator nucleating system even when relatively small amounts of this nucleating system is used, as compared to azodicarbonamide and illustrates that the dynamic thermal stability of the CPVC composition is not objectionably affected as a result of the use of the metal borohydride/proton donor activator nucleating system.

TABLE II

| Nucleating System | Sample Parts By Weight | | | | |
|---|---|---|---|---|---|
| | 10 | 11 | 12 | 13 | Control |
| Azodicarbonamide | 0.5 | — | — | — | — |
| Sodium borohydride | — | 0.25 | 0.15 | 0.15 | — |
| Terephthalic acid | — | — | 1.3 | — | — |
| Polyacrylic acid | — | — | — | 1.1 | — |
| Properties | | | | | |
| Foam density (pcf) | 2.3 | 7.7 | 3.3 | 3.5 | 3.2 |
| Cell size (microns) | 375 | 1250 | 350 | 350 | 875 |
| Mill Sheet DTS (minutes) | 8.0 | 11.5 | 11.0 | 12.2 | 11.8 |

The present invention can be used for making a wide variety of low density foam products, including roof insulation sheeting, wall insulation, house siding, and the like.

We claim:

1. The process for making a low density chlorinated polyvinyl chloride polymer foam said polymer having a chlorine content of from 60% to 73% by weight having an essentially closed-cell cellular structure comprised predominantly of cells having a cell size of less than 500 microns, said process comprising:
   (a) dispersing a nucleating system comprised of an alkali metal borohydride and a proton donor activator compatible with said polymer selected from the group consisting of hydrated salts and organic acids within a chlorinated polyvinyl chloride polymer composition,
   (b) forming cell nuclei of hydrogen gas within said chlorinated polyvinyl chloride polymer composition by heating said nucleating system to cause said proton donor activator to produce protons which react with said alkali metal borohydride to form hydrogen gas, and
   (c) expanding said chlorinated polyvinyl chloride polymer composition into said foam product utilizing a primary blowing agent, said nucleating system being activated to form said cell nuclei at a temperature above 25° C. but below the highest processing temperature which the CPVC polymer composition experiences before the CPVC polymer composition expands.

2. The process of claim 1 wherein said nucleating system is activated at a temperature between 60° C. to 180° C.

3. The process of claim 2 wherein said proton donor activator is a hydrate that liberates water of hydration when heated to a temperature between 60° to 180° C.

4. The process of claim 2 wherein said proton donor activator is an organic acid which reacts with alkali metal borohydrides at temperatures between 60° to 180° C.

5. The process of claim 1 wherein said primary blowing agent is a halogenated hydrocarbon containing 1 to 3 carbon atoms.

6. The process of claim 1 wherein said primary blowing agent is a chlorofluoroalkene containing 1 to 2 carbon atoms.

7. The process of claim 6 wherein said chlorinated polyvinyl chloride polymer composition containing said nucleating system is charged into and advanced through an extruder, and wherein said primary blowing agent is introduced into said chlorinated polyvinyl within said extruder, and wherein said expansion of said chlorinated polyvinyl chloride polymer composition occurs as said composition is discharged from said extruder.

8. The process of claim 1 wherein said chlorinated polyvinyl chloride polymer is a post-chlorinated polyvinyl chloride homopolymer.

* * * * *